US011001013B2

(12) United States Patent
Samulski et al.

(10) Patent No.: US 11,001,013 B2
(45) Date of Patent: May 11, 2021

(54) PRE-PREG AND COMPOSITE PRODUCTS COMPRISING FIBERS AND A LIQUID CRYSTAL THERMOSET PRECURSOR

(71) Applicant: ALLOTROPICA TECHNOLOGIES INC., Chapel Hil, NC (US)

(72) Inventors: Edward T. Samulski, Chapel Hill, NC (US); Theodorus Jacobus Dingemans, Delft (NL)

(73) Assignee: ALLOTROPICA TECHNOLOGIES INC., Chapel Hil, NC (US)

( * ) Notice: Subject to any disclaimer, the term of this patent is extended or adjusted under 35 U.S.C. 154(b) by 148 days.

(21) Appl. No.: 16/072,034

(22) PCT Filed: Jan. 20, 2017

(86) PCT No.: PCT/IB2017/050305
§ 371 (c)(1),
(2) Date: Jul. 23, 2018

(87) PCT Pub. No.: WO2017/125887
PCT Pub. Date: Jul. 27, 2017

(65) Prior Publication Data
US 2019/0039331 A1 Feb. 7, 2019

Related U.S. Application Data

(60) Provisional application No. 62/281,776, filed on Jan. 22, 2016.

(30) Foreign Application Priority Data

Mar. 3, 2016 (NL) ...................................... 2016357

(51) Int. Cl.
*B29C 70/20* (2006.01)
*C08J 5/04* (2006.01)
(Continued)

(52) U.S. Cl.
CPC .......... *B29C 70/202* (2013.01); *B29C 70/522* (2013.01); *B29C 70/528* (2013.01);
(Continued)

(58) Field of Classification Search
CPC ..... C08L 67/00; C08G 59/4042; C08G 69/44; C08G 73/16; Y10T 428/24124;
(Continued)

(56) References Cited

U.S. PATENT DOCUMENTS 4,540,737 A * 9/1985 Wissbrun .............. B29C 70/523
264/171.16
5,401,179 A 3/1995 Shinchi
(Continued)

FOREIGN PATENT DOCUMENTS

EP 0117098 A2 8/1984
JP S59107943 A 6/1984
(Continued)

OTHER PUBLICATIONS

International Search Report and Written Opinion for Corresponding International Application No. PCT/IB2017/050305 (11 Pages) (dated Mar. 22, 2017).
(Continued)

*Primary Examiner* — Camie S Thompson
(74) *Attorney, Agent, or Firm* — Lucas & Mercanti, LLP

(57) ABSTRACT

A pre-preg product, such as a tape or sheet suitable for forming a composite having reinforcement fibers and a liquid crystal thermoset (LCT) precursor is provided. Further aspects of the invention are directed to a method for preparation of the pre-preg product and to composite products based on the pre-preg product.

14 Claims, 3 Drawing Sheets

Figure 1:
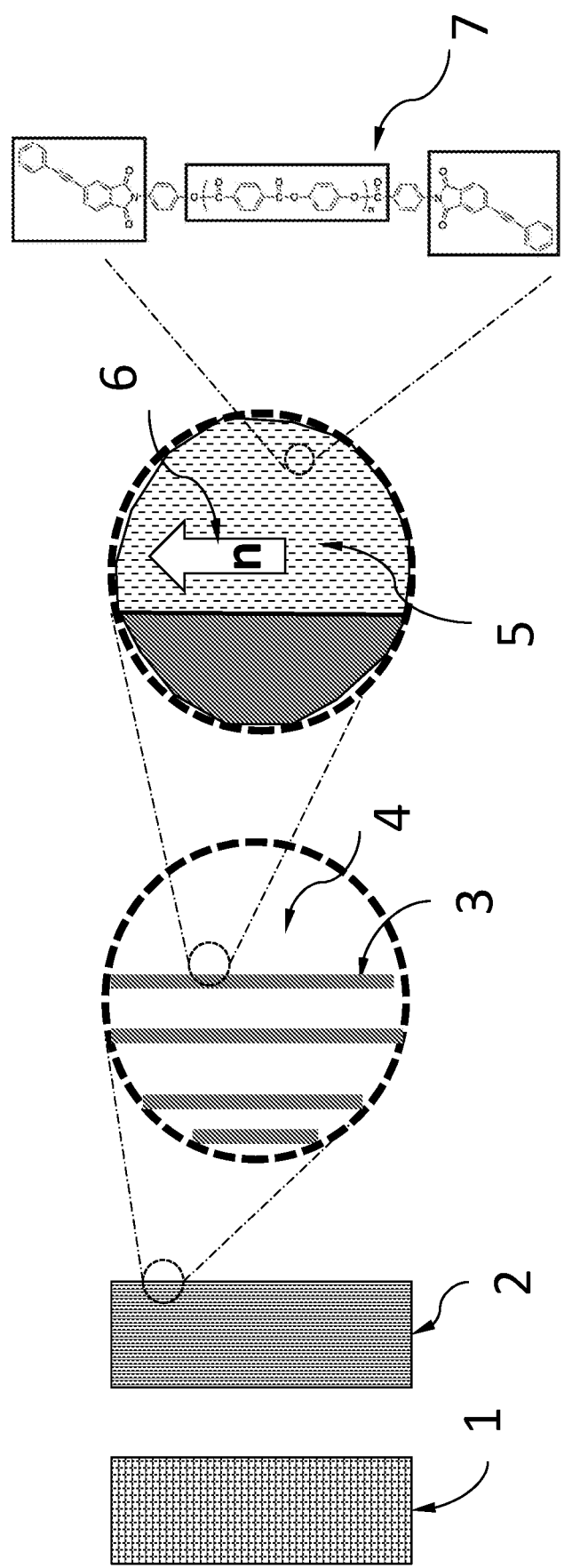

(51) Int. Cl.

| | | |
|---|---|---|
| *C08J 5/24* | (2006.01) | |
| *C09K 19/34* | (2006.01) | |
| *C08L 101/12* | (2006.01) | |
| *C09K 19/06* | (2006.01) | |
| *B29C 70/52* | (2006.01) | |
| *B29D 7/01* | (2006.01) | |
| *C08J 3/24* | (2006.01) | |
| *B29K 71/00* | (2006.01) | |
| *B29K 77/00* | (2006.01) | |
| *B29K 277/00* | (2006.01) | |
| *B29K 307/04* | (2006.01) | |
| *B29K 309/02* | (2006.01) | |
| *B29K 309/08* | (2006.01) | |

(52) U.S. Cl.
CPC ...... *B29D 7/01* (2013.01); *C08J 5/04* (2013.01); *C08J 5/24* (2013.01); *C08L 101/12* (2013.01); *C09K 19/06* (2013.01); *C09K 19/3402* (2013.01); *B29K 2071/02* (2013.01); *B29K 2077/10* (2013.01); *B29K 2277/10* (2013.01); *B29K 2307/04* (2013.01); *B29K 2309/02* (2013.01); *B29K 2309/08* (2013.01); *B29K 2995/004* (2013.01); *B29K 2995/0012* (2013.01); *C08J 3/24* (2013.01); *C08J 2300/12* (2013.01); *C08J 2300/24* (2013.01)

(58) Field of Classification Search
CPC ... Y10T 428/24612; Y10T 428/249944; Y10T 428/2971; Y10T 442/2984; Y10T 442/2992; D04H 3/115; D04H 3/04; D04H 3/12; B29C 70/52; B29C 70/506; B29C 70/202; B29C 70/522; C08J 2300/12; C08J 5/04; C08J 5/24; B29K 2309/08; B29K 2307/04; B29D 7/04; C09K 19/3823; B32B 2260/021; B32B 2260/046; B32B 2262/10; B32B 2262/14; B32B 2262/101; B32B 2250/44; B32B 27/12; B32B 5/12; B32B 5/26; B32B 2305/076; B32B 2305/10

USPC ............ 528/170, 208, 211, 59; 525/437; 252/299.01; 427/385.5; 428/113, 172, 428/298.7, 298.4, 296; 442/164, 179, 442/180; 524/612; 548/435

See application file for complete search history.

(56) References Cited

U.S. PATENT DOCUMENTS

| | | | |
|---|---|---|---|
| 8,163,122 | B1 | 4/2012 | Paul |
| 2002/0132933 | A1* | 9/2002 | Dingemans ............ C08G 63/60 525/437 |
| 2009/0224203 | A1* | 9/2009 | Jung ................. C07D 207/452 252/299.61 |
| 2010/0124037 | A1 | 5/2010 | Jung et al. |
| 2011/0232944 | A1 | 9/2011 | Lee et al. |
| 2012/0263913 | A1 | 10/2012 | Karem |
| 2014/0083247 | A1 | 3/2014 | Nair |
| 2015/0266268 | A1 | 9/2015 | Coxon |

FOREIGN PATENT DOCUMENTS

| | | |
|---|---|---|
| JP | H09500158 A | 1/1997 |
| WO | 9609158 A1 | 3/1996 |
| WO | 0222706 A1 | 3/2002 |
| WO | 2015191354 A1 | 12/2015 |

OTHER PUBLICATIONS

International Preliminary Report on Patentability for International Application No. PCT/IB2017/050305 (24 Pages) (dated Apr. 6, 2018).

* cited by examiner

PRE-PREG AND COMPOSITE PRODUCTS COMPRISING FIBERS AND A LIQUID CRYSTAL THERMOSET PRECURSOR

CROSS-REFERENCE TO RELATED APPLICATIONS

This application is a 371 of PCT/IB2017/050305, filed Jan. 20, 2017, which in turn claims the benefit of U.S. Provisional Application No. 62/281,776, filed Jan. 22, 2016 and Netherlands Patent Application No. 2016357, filed Mar. 3, 2016.

FIELD OF THE INVENTION

The invention is in the field of composite materials. In particular, the invention is directed to pre-impregnated products and composite products thereof, comprising reinforcing fibers.

BACKGROUND OF THE INVENTION

Reinforced composite products are typically based on reinforcement fibers (e.g. carbon fibers) and a matrix material (e.g. epoxy resin, thermoplastics) used to bind the fibers. To facilitate the production of composite products, pre-impregnated products (also referred to as pre-preg products) are used as intermediate goods. The pre-preg products comprise the fibers and a partially cured matrix material. As such the pre-preg product is typically shapeable (optionally after heating and applying pressure) to follow the contours of the mold or mandrel that is used to make the composite product. The composite materials are typically formed by a manual or automated lay-up process—laying out of the pre-preg product in a mold—and subsequent heating possibly under pressure, vacuum or reduced pressure or both such that the matrix material wets-out the fabric and further cures. Use of the pre-preg product thus greatly facilitates the production of composite materials.

However, known pre-preg based composite products also face drawbacks. The bonding of the reinforcement fibers and the matrix material at their interface is rather weak. Efforts to strengthen this bonding include adding "sizing" to the outer surfaces of the reinforcement fibers to promote adhesion including the formation of chemical bonds (covalent, ionic, hydrogen and the like) between the fibers and the surrounding matrix material. However, despite these efforts, the performance of the composite products is still limited. For example, by exposing the composite products to a range of temperatures, on subsequent fracturing the product one typically observes "fiber pull-out" that is characteristic of a weak bond between the fiber and the matrix.

The phenomenon of a weakened interfacial bonding of the known composite materials may be caused by a mismatch in the respective coefficients of thermal expansion (CTE) of the fibers and the surrounding matrix material. In case the CTE of, for instance, the matrix material is sufficiently higher than that of the fibers this results in an interfacial stress. Thus on cooling and heating the composites products, very high mechanical stresses may result from the CTE mismatch weakening the adhesion between the reinforcement and the matrix.

It is desirable to have pre-preg products and resulting composite products that suffer less of the above-mentioned drawbacks and have improved mechanical properties with respect to the composite products of known pre-preg products.

SUMMARY OF THE INVENTION

The present inventors have surprisingly found a pre-preg product that meets this objective by providing a pre-preg product, such as a tape or sheet suitable for forming a composite, that comprises reinforcement fibers and a liquid crystal thermoset (LCT) precursor.

The LCT precursor in the pre-preg product can be thermally treated to thermoset and form a thermoset matrix surrounding the reinforcement fibers. As such a composite product in accordance with the present invention is formed.

DETAILED DESCRIPTION OF THE INVENTION

It has surprisingly been found that the use of the LCT precursor may lead to superior mechanical properties of the composite product based thereon, compared to known composite products that are, for example, based on isotropic matrices such as epoxy resin or thermoplastics like polyether ether ketone (PEEK), polyether ketone (PEK), polyetherketoneketone (PEKK), poly(p-phenylene sulfide) (PPS), polyetherimide (PEI), polyethersulfone (PES) and the like.

Without wishing to be bound by theory, the inventors believe that the improved mechanical properties may be the result of the specific molecular orientation of the LCT precursor. Since the LCT precursor has liquid crystalline properties, the mean direction of molecular orientational order in the LCT melt may be characterized by a director n. This director n is an apolar vector indicating the average orientation of the longitudinal axes within a group of LCT precursor oligomers. It is believed that the LCT precursors may be oriented with their longitudinal axis, and hence n, in substantially the same direction as the longitudinal axis of their nearest reinforcement fiber and that as a result, the coefficients of thermal expansion (CTE) of the thermoset matrix based on the LCT precursor will be similar to the CTE of the reinforcement fibers. This may lead to less mechanical stress on thermal cycling (cooling or increasing the temperature) of the composite products.

Substantially the same direction may be expressed by the angle between the director n and the longitudinal axis of the fiber. As such, a 90° angle means that director n is orthogonal to the longitudinal axis of the fiber and 0° means perfect alignment. Substantially the same direction means that the angle is preferably smaller than 60°, more preferably smaller than 45°, most preferably smaller than 20°. This would constitute so-called "planar anchoring" of the LCT fluid phase at the fiber interface with the director n along the longitudinal direction of the fiber.

In the case of a domain of LCT precursors that are positioned in between two adjacent fibers having their longitudinal axes at some arbitrary angle and not parallel, the director n spans the space between the two fibers by changing its direction continuously so that it satisfies the above planar anchoring condition at both fiber surfaces. Locally at the fiber-LCT precursor interface the director n is aligned parallel to the longitudinal fiber axis but on a larger length scale the distribution of the n direction may be different from the angle as described in the previous paragraph. This may in particular be the case of a weave arrangement of the fibers.

FIG. 1 is a schematic representation of a particular embodiment of the present invention and depicts the above-described principle of the alignment of the director n with the reinforcement fiber. Two pre-preg products are depicted, one wherein the fibers (3) are arranged as weave (1) and one wherein the fibers (3) are arranged in a roving (2). The LCT precursors (5) occupy the space (4) in between the fibers. The director n (6) is aligned with the longitudinal axis of the nearest fiber.

Thus, in a preferred embodiment of the present invention, the LCT precursor has a director n, which is substantially oriented along the longitudinal axis of the nearest reinforcement fiber.

The degree of which the LCT precursors are aligned with the director n can be expressed by an orientational order parameter, $<P_2>$, which is the average value of the second Legendre polynomial defining the average orientation order of the LCT precursor molecular axes relative to n. The orientational order parameter can be measured by recording an X-ray diffraction (XRD) pattern and plotting the intensity versus azimuthal angle ("chi") of the pattern.

A $<P_2>$ of 1 corresponds to all LCT precursor molecules (of which the XRD pattern is recorded) being aligned with the director n. The orientation of n with respect to the longitudinal axis of a the nearest reinforcement fiber can be determined by the position of the maxima in the diffracted azimuthal X-ray intensity. It is preferred that the pre-preg product of the present inventions comprises LCT precursors having the orientational order parameter $<P_2>$ of between 0.1 and 1.

Reinforcement Fibers

The reinforcement fibers may be commonly used fibers as e.g. described in *Fundamentals of Fibre Reinforced Composite Materials* by A. R. Bunsell J Renard, IOP Publishing Ltd 2005.

The reinforcement fibers are preferably selected from the group consisting of carbon fibers, fiber glass, aramid fibers, ceramic fibers, polybenzimidazole (PBI) fibers, polybenzoxazole (PBO) fibers, carbon nanotube fibers and combinations thereof.

For a comprehensive overview of carbon fibers, reference is made to Carbon Fibers and their Composites by Peter Morgan published in 2005 by Taylor and Francis Group.

An example of aramid fibers are those fibers based on poly(p-phenylene terephthalamide) (commercially available as Kevlar™ and Twaron™). Polybenzimidazole (PBI) fibers are commercially available as PBI™ and polybenzoxazole (PBO) fibers are commercially available as Zylon™.

Preferably, the reinforcement fibers are continuous. Non-continuous or short carbon fibers with length of typically up to 0.1 to 5 mm may be incorporated into LCT composites may also be used.

It is preferred that the fibers in the pre-preg product are oriented substantially parallel over a certain length scale as in a bundle or roving. Tapes comprising fibers that are oriented substantially parallel are therefore preferred.

In the embodiment wherein the pre-preg product is a tape, it is preferred that the longitudinal axis of the reinforcement fibers in the tape are substantially aligned with the longitudinal direction of the tape, so-called unidirectional (UD) tapes. Substantially align means in this respect that the angle between the longitudinal axes of the tape and the fiber is less than 15°, preferably less than 5°. Larger angles may be encountered in woven pre-preg tapes but the LCT director n is anticipated to align next to such fibers and result in a better match of CTEs.

LCT Precursors

The LCT precursors used in the method of the invention and present in the composition of the invention are described in detail below. An LCT precursor is a reactive precursor capable of forming an LCT upon reaction at a temperature of typically 300 to 400° C. LCT oligomers are the most preferred type of LCT precursors that may be used in the present invention.

The term LCT oligomers as used herein may refer to liquid crystal oligomers that form a liquid crystal thermoset when reacted (e.g. by chain-extension and by cross-linking). The LCT oligomers typically are capable of such reaction by having certain reactive end-groups. The LCT oligomers can thus be regarded as an oligomer of a liquid crystal thermoset, which may have reactive end-groups that make the oligomer capable of forming an LCT when reacted.

Within the scope of the present invention, the term "oligomer(s)" designates mixtures of varying backbone length liquid crystal polymer precursors, of preferably maximally 150 repeat units, within the weight range of approximately 500 to approximately 15,000 grams per mole (and not more than 20,000 gram/mol) that are not isolated as identical, discreet molecular weight molecules.

LCT oligomers are relatively short liquid crystal polymers (LCP) with one or two reactive chain-end functionalities. The LCT oligomer is a low molar mass molecule (compared to LCP polymers) with the same monomer distributions observed in high molar mass LCP polymers. LCT oligomers may exhibit lower meting temperatures and significantly lower viscosities than the analogous LCPs. LCPs spontaneously exhibit higher degrees of molecular order (chain parallelism) while in the molten state unlike the unoriented (isotropic) state of other conventional polymeric species. The ability of these LCT oligomers to maintain molecular order in the molten state, a liquid crystal phase, has pronounced effects on the solid-state physical morphology and the properties of this class of polymers. Specifically, relative to conventional polymers, liquid crystalline polymers exhibit long-range molecular order in the solid state and lower melt viscosities at higher molecular weights. The improved molecular order in the solid state makes liquid crystal polymers desirable for uses in shape molded composite materials. Moreover, LCT oligomers are preferred over LCPs since LCT oligomers demonstrate improved wetting-out (impregnation) during the preparation of composite materials.

The LCT oligomer preferably comprises a liquid crystal backbone selected from the group consisting of an ester, an ester-imide and an ester-amide, wherein the backbone of the oligomer is entirely, or at least substantially entirely, aromatic in composition. This means that preferably at least 95 mol %, more preferably at least 99 mol %, even more preferably 100 mol % of the monomers present in the backbone are aromatic. Such LCT oligomers are known from WO 02/22706 and are commercially available.

LCT oligomers that are particularly preferred for the present invention are those comprising about 3 to 15, more preferably 4 to 10, most preferably about 5 to 7, repeating units in the backbone. It was found that these relatively short LCT oligomers show particularly favorable behavior in terms of alignment of the director n. It may be appreciated that the number of repeating units in the backbone is an average number and the exact number of units may vary from oligomer to oligomer as is typically the case for oligomers and polymers.

Examples of particularly preferred LCT oligomers are those on naphthalene-2,6-dicarboxylic acid (NDA), 2-hydroxy-6-naphthoic acid (HNA), or combinations thereof. A typical structure of a preferred LCT oligomer is based on 4-hydroxybenzoic $acid_{0.6}NDA_{0.05}$terephthalic $acid_{0.15}$4,4'-$biphenol_{0.2n}$-.

The LCT oligomers typically have one or two reactive end-groups such that the oligomers can react with each other to form a liquid crystal thermoset. Thus, the LCT oligomer may be capable of self-polymerizing by chain-extension. The liquid crystal oligomers are preferably end-capped with self-reactive end-groups, in which case the LCT oligomer has a general structure of E-Z-E, wherein Z indicates the oligomer backbone and E the self-reactive end-group (hereinafter also referred to as the "self-reactive end-cap" or "end-cap"). A self-reactive end-cap is capable of reacting with another self-reactive end-cap of the same type. Accordingly, an LCT oligomer with reactive end-caps is capable of chain-extension and/or crosslinking.

The end-cap is preferably a phenylacetylene, phenylmaleimide, or nadimide end-cap. Good results have been obtained using an end-cap selected from the group consisting of

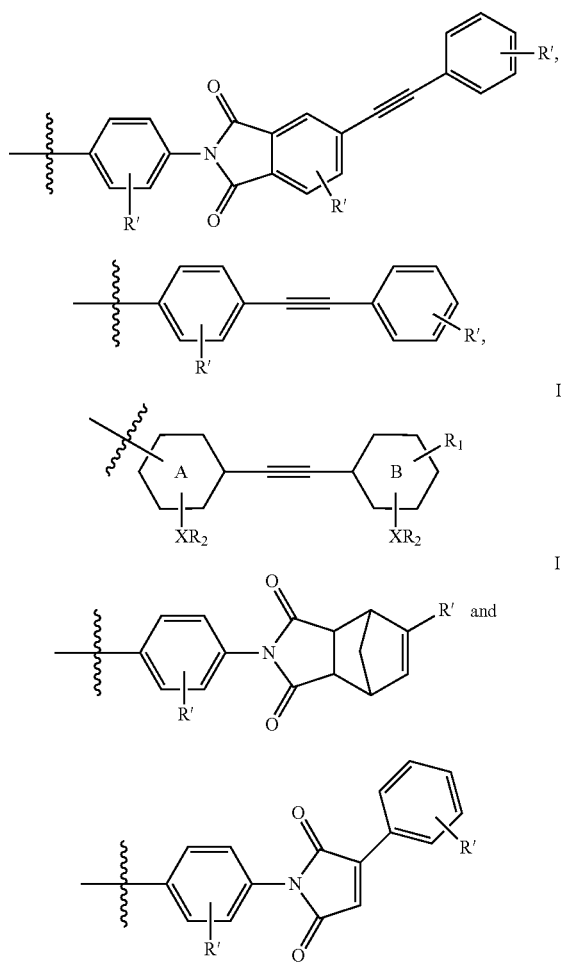

wherein R' is independently one or more hydrogen, alkyl groups containing six or less carbon atoms, aryl groups containing six or less carbon atoms, aryl groups containing less than ten carbon atoms, lower alkoxy groups containing six or less carbons, lower aryloxy groups containing ten or less carbon atoms, fluorine, chlorine, bromine or iodine. For example, R' may be H for all groups.

Rings A and B are independently a 6-membered aryl or heteroaryl, optionally fused to an aryl or heteroaryl. X is independently O, C(O), OC(O), C(O)O, S, $NR_1$, $C(O)NR_1$ or $NR_1C(O)$; $R_1$ is independently one or more alkynyl, alkyl, alkenyl, aryl, heteroaryl, cycloalkyl, heterocyclyl, halo, or haloalkyl; $R_2$ is independently hydrogen, hydroxyl, alkyl, aryl, heteroaryl, cycloalkyl, or heterocyclyl.

Regarding end-cap III, the ethynyl functional group may be located at a variety of positions at rings A relative to the oligomer back bone, such as at the 4 position (para position), 3 position (meta position), or 2 position (ortho position). In particular embodiments, however, the ethynyl functional group is located at the 4 position like for end-cap II.

With respect to end-cap II, $XR_2$ may be OH, O-alkyl (e.g., $OCH_3$), OC(O)-alkyl (e.g., $OC(O)CH_3$), C(O)OH, C(O)O-alkyl (e.g., $C(O)OCH_3$), OC(O)OH, OC(O)O-alkyl (e.g., $OC(O)OCH_3$), $NH_2$, NH-alkyl (e.g., $NHCH_3$), $C(O)NH_2$, C(O)NH-alkyl (e.g., $C(O)NHCH_3$), NHC(O)H, NHC(O)-alkyl (e.g., $NHC(O)CH_3$), NHC(O)OH, NHC(O)O-alkyl (e.g., $NHC(O)OCH_3$), etc.

Specific embodiments of suitable end-caps may include, for instance, 4-phenylethynyl acetanilide, 4-phenylethynyl benzoic acid, methyl 4-phenylethynyl benzoate, 4-phenylethynyl phenyl acetate, 4-phenylethynyl benzamide, 4-phenylethynyl aniline, N-methyl-4-phenylethynyl aniline, 4-phenylethynyl phenyl carbamic acid, 4-phenylethynyl phenol, 3-phenylethynyl benzoic acid, 3-phenylethynyl aniline, 3-phenylethynyl phenyl acetate, 3-phenylethynyl phenol, 3-phenylethynyl acetanilide, 4-carboxyphenylethynyl benzoic acid, 4-aminophenylethynyl aniline and so forth. Particularly suitable are 4-phenylethynyl benzoic acid, 4-phenylethynyl aniline, 4-phenylethynyl phenyl acetate, 4-phenylethynyl acetanilide, and 4-phenylethynyl phenol.

With respect to end-cap III, "haloalkyl" refers to substitution of alkyl groups with 1 to 5 or in some embodiments 1 to 3 halo groups.

With respect to end-cap III, "heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N-oxide (NO), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

With respect to end-cap III, "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N-oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

Of the five end-caps depicted above, the first two (I and II) were found to work best and to be most versatile and are therefore preferred. The last two (III and IV) have a limited processing temperature range and are therefore less preferred.

The end-capped all-aromatic LCT oligomers described herein display many superior and improved properties over their non-end-capped high molecular weight LCP analogs. Among these properties are: unusually lowered melt viscosities for these oligomeric species compared to non-end-capped higher molecular weight LCP analogs and comparable and/or superior to previously end-capped lower weight non-oligomeric species (end-capped single pure molecules), stability of melt viscosities at elevated temperatures for extended periods of time relative to previous liquid crystalline products, and reduced brittleness (i.e. rubber behavior) above the glass transition temperature.

Very good results have been obtained using the end-capped all-aromatic LCT oligomers described in WO 02/22706 as the LCT oligomer in the present invention, in particular in case of the ester based LCT oligomer.

The LCT oligomers may have a number average molecular weight ($M_n$) of 500-20,000, preferably 1,000-13,000. Such molecular weights provide the LCT oligomers with a relative low viscosity, which results in good processability when used in the method of the invention (vide infra). It may further be advantageous to use LCT oligomers having a number average molecular weight ($M_n$) of at least 5,000. Such LCT oligomers provide for a low melt viscosity and excellent after-cure mechanical properties in the composite.

The LCT oligomers preferably have a backbone having at least one structural repeat unit selected from the group consisting of

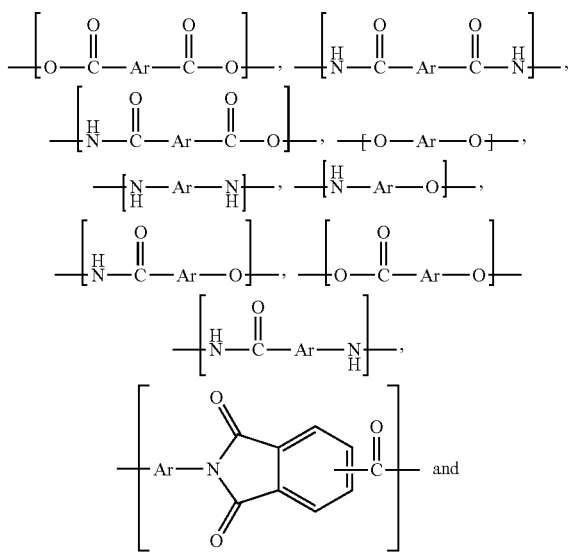

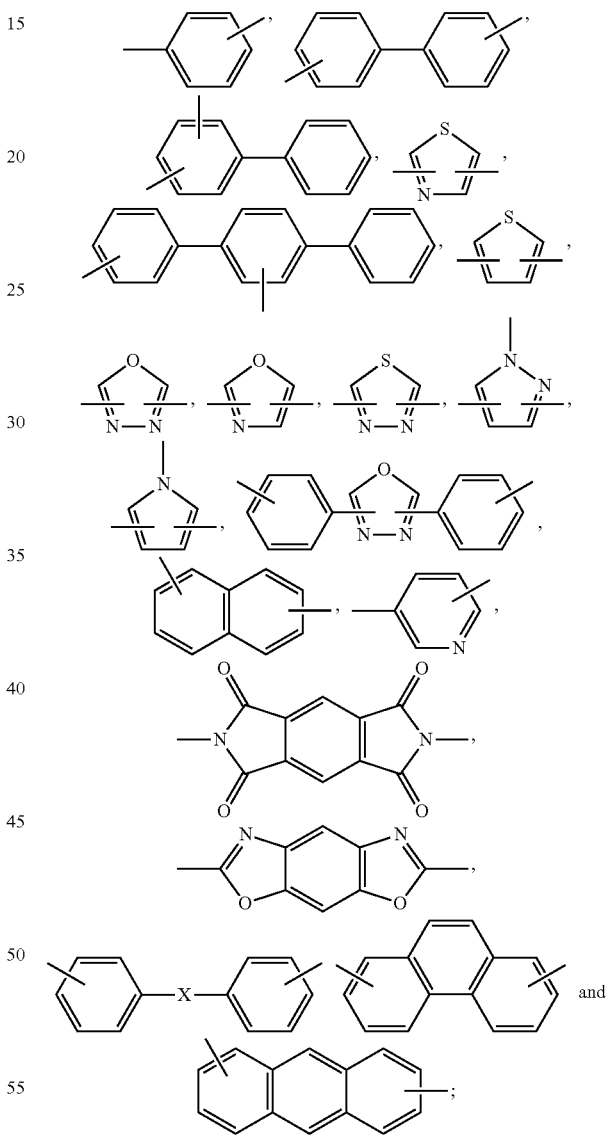

wherein Ar is an aromatic group. Ar may in particular be selected from the group consisting of wherein X is selected from the group consisting of

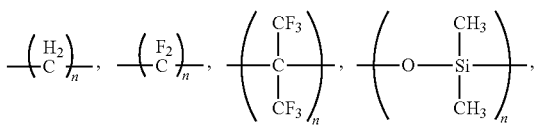

-continued

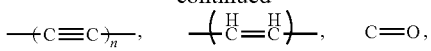

S, O, and $SO_2$;
wherein n is a number less than 500.

The above-described LCT oligomers are known from WO 02/22706 and WO 2014/047015 (which are both incorporated herein in their entirety) and can be prepared according to the methods described therein.

Method of Preparation

The pre-preg product in accordance with the present invention may readily be prepared. A preferred method for preparation comprises the impregnation of an arrangement of the reinforcement fibers (herein also referred to a arrangement of fibers or simply arrangement) with the liquid crystal thermoset (LCT) precursor.

The reinforcement fibers may be arranged as is common for the preparation of pre-preg and composite products. Typical arrangement are those wherein the fibers are arranged as a tape or roving (or a bundle), a weave, a web and the like. Preferably, the arrangement of the reinforcement fibers is a tape-like roving or the weave and the uniaxial (i.e. unidirectional) tape-like roving is most preferred. Also for this reason are continuous fibers preferred.

The impregnation of the arrangement of the reinforcement fibers can be performed by using a melt, a solution or a powder comprising the LCT precursor.

In a preferred embodiment of the present invention, the impregnation comprises pultrusion. In this particular embodiment, the collection of reinforcement fibers are moved (e.g. pulled or drawn) through the melt comprising the liquid crystal thermoset (LCT) precursor to obtain the impregnated arrangement of the reinforcement fibers.

Figure 2:
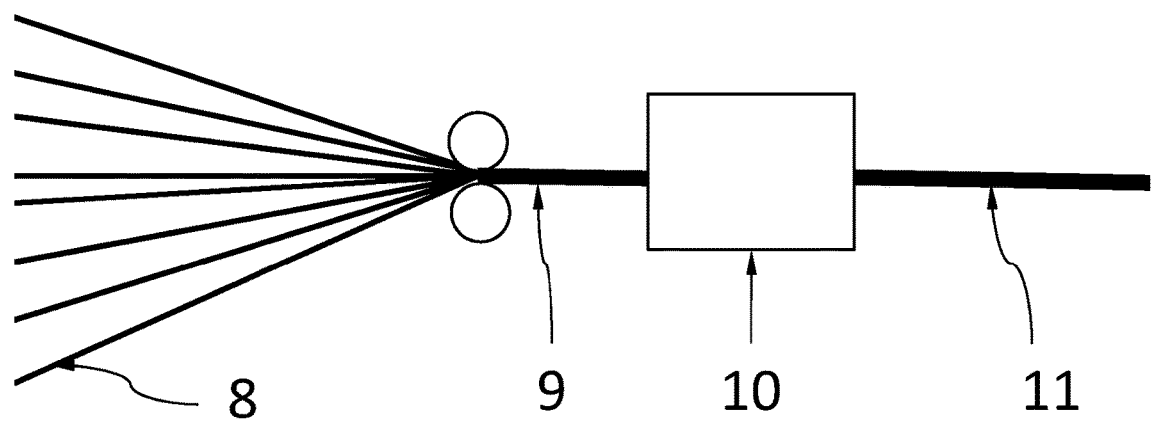

FIG. 2 illustrates a particular embodiment of the present invention that comprises a pultrusion process. Reinforcement fibers (8) are arranged in a roving or a weave (8) that is moved through the melt (10) of the LCT precursors resulting in the impregnated arrangement of fibers (11).

Pultrusion is a known technique for glass and carbon fiber based thermoplastic matrix compositions (e.g. polyester resins). The present inventors have surprisingly found that the pre-preg product obtained by the pultrusion process leads to composite materials with very favorable mechanical properties.

It is believed that the moving (e.g. drawing) of the fibers through the melt of the LCT precursor facilitates and/or enhances the macroscopic alignment of the director n without diminishing the orientation of it along the longitudinal axis of the nearest fibers. This facilitated and/or enhanced alignment may be the result of shear forces that are experienced by the LCT precursor melt when the fibers are moved through it.

Depending on the exact composition and chemical structure of the LCT precursor, the melt of the LCT precursor is at a temperature between 250 and 350° C.

The impregnated reinforcement fiber arrangement is typically cooled to fix the alignment of the LCT precursors in the pre-preg product.

The impregnation carried out with the solution or powder comprising the LCT precursor typically comprises contacting the arrangement of reinforcement fibers with the solution or powder followed by a heating step at a temperature of at least the melting point of the LCT precursor.

Contacting the powder with the arrangement of reinforcement fibers can be achieved by LCT powder deposition methods (e.g. by electrostatic coating) or by using a slurry of the powder comprising the LCT precursor (e.g. a slurry comprising water and the powder). The LCT precursor can be transferred to the fiber using a slurry method, i.e. a fine polymer powder/liquid (e.g. water) slurry is prepared and the arrangement is pulled through the slurry. The liquid (e.g. water) is then typically evaporated and the powder may be molten and moved through a die.

Contacting the arrangement with the solution can for instance be carried out by applying the solution of LCT precursors onto the arrangement, e.g. spraying the solution or by moving the arrangement through the solution and subsequent evaporation of the solvent.

When the arrangement of reinforcement fibers is impregnated with the solution or the powder of the LCT precursors, an additional heating step, typically to about the melting temperature of the LCT precursor (e.g. between 250 and 350° C.), may be required after contacting the arrangement of fibers with the LCT precursor to bring the LCT precursor to about its melting point.

Without wishing to be bound by theory, it is believed that due to the liquid crystal characteristic of the LCT precursor, the LCT spontaneously orients relative to the nearby fibers when melted in the heating step. As such, the director n of the LCT precursor is substantially oriented along the longitudinal axis of the nearest reinforcement fiber.

As also described herein above, the LCT precursor, in particular the LCT oligomer with one or two end-caps in accordance with the present invention, have unusually lowered melt viscosities for these weight polymer species compared to non-end-capped higher molecular weight LCP analogs and comparable and/or superior to previously end-capped lower weight non-oligomeric species (end-capped single pure molecules), stable melt viscosities at elevated temperatures for extended periods of time relative to previous liquid crystalline products, and reduced brittleness (i.e. rubbery behavior) above the glass transition temperature. These properties of the LCT precursor are very advantageous for melt impregnation of the fiber arrangement and the pultrusion method in accordance with the present invention.

The melt comprising LCT precursor is preferably free of solvents and/or consist essentially of the LCT precursor. However, some additives that are commonly used for composite products may be added. Preferably, the melt comprises 50 wt % LCT precursor, more preferably 80% LCT, most preferably 95 wt % LCT precursor. The melt is typically at a temperature of at least the melting point of the LCT precursor.

The solution of LCT precursor comprises a solvent that blends with the LCT precursor. Preferred solvents are N-methyl-2-pyrrolidone (NMP), dimethylacetamide (DMAc), pentafluorophenol, hexafluoroisopropanol and tetrahydrofuran. These solvents can also be used in case a powder comprising LCT precursor is contacted with the arrangement of fibers, for instance by forming a slurry comprising the solvent and the powder. The heating step comprised in the impregnation with the solution or powder as described above, typically also results in the evaporation of at least part of the solvents. The degree of evaporation may be controlled by the duration and temperature of the heating.

After the arrangement of fibers is impregnated with the LCT precursor, the resulted impregnated fiber arrangement may be moved through a die, rollers or anther setup. In this step, the desired shape of the pre-preg product is obtained and possible remaining solvents and/or gasses (such as air) may be removed.

The die, rollers or other setup are preferably heated (e.g. by infra-red lamps) such that the impregnated arrangement may be easily shaped. Typical temperatures at which the impregnated fiber arrangement is moved through the die are in the range of 250 to 350° C., preferably 280 to 310° C. Such temperatures typically do not promote very much crosslinking. After this additional step, the pre-preg product is typically cooled.

In the case where the arrangement of fibers is impregnated with the LCT and subsequently passed through the heated die the shear field in the additional heating step may also results in an enhancement of the macroscopic alignment of the director n in the resulting pre-preg.

In a particular embodiment of the present invention, partial curing of the LCT precursors may occur during the movement of the impregnated fiber arrangement through the die. Alternatively or additionally, the partial curing or further curing may take place after the step of moving through the die by further heating the impregnated fiber arrangement. The curing of the impregnated fiber arrangement may be controlled by selecting the appropriate temperature and time. The partial curing of the LCT precursors may be comparable to B or C staging as is commonly done for epoxy resins and pre-pregs thereof.

Pre-Preg Laminates

A further aspect of the present invention is a pre-preg laminate product comprising a plurality of stacked pre-preg products in accordance with the present invention, wherein the longitudinal axis of the reinforcement fibers of a first pre-preg product that is stacked on a second prep-preg product are oriented in a different direction than the longitudinal axis of the reinforcement fibers of the second pre-preg product.

Preferably, by taking advantage of the self-reactive properties of the end-caps of the LCT precursor, heat is applied after stacking the pre-preg product to effect at least partial cross-linking between the pre-preg products of the pre-preg laminate. Care should be taken not to fully cure the pre-preg laminate in this process. The full curing of the pre-preg laminate may be avoided by selected appropriate heating temperatures and times.

A preferred embodiment of the present invention is thus a pre-preg laminate product of which at least part of the stacked pre-preg products are at least partially cross-linked.

Composite Products and Article Thereof

A further aspect of the present invention is a composite product based on the pre-preg product in accordance with the present invention, wherein the reinforcement fibers are surrounded by a matrix based on the liquid crystal thermoset (LCT) precursor which are at least partially cross-linked.

It is preferred that the composite product of the present invention is based on the pre-preg product. This means that preferably the pre-preg product or the pre-preg laminate product thereof is used for the preparation of the composite product. Such a preparation method may be similar to commonly used methods for the preparation of known composite products and for example may include hand or robotic layup followed by a curing step to form (crosslink) the matrix. However, other preparation processes that do not require the pre-preg product may also provide the composite product in accordance with the present invention. For instance, a direct preparation of the composite product may be resin transfer molding, vacuum injection molding and the like. Any composite material comprising the reinforcement fibers which are surrounded by the matrix based on the liquid crystal thermoset (LCT) precursor that are at least partially cross-linked is a composite material in accordance with the present invention.

A particular aspect of the present invention is directed to the preparation method of the composite products that comprises laying up and heat setting of the pre-preg products. The pre-preg products are typically laid on a mold or mandrel. During heat setting of the pre-preg polymers, the end-capped of the LCT-precursors react and form a covalent bond. As described herein above, the LCT precursor thus polymerizes on heat setting. The LCT precursor thus forms a matrix (also referred to as LCT matrix) that surrounds the reinforcement fibers.

Lay-up of the pre-preg product in a mold typically means that a plurality of pre-preg products are laid on top of each other. A great advantage of the use of LCT precursors is that one LCT precursor compound may not only react with another LCT precursor compound that is present in the same pre-preg product, but it may also react with a LCT precursor compound that is present in another pre-preg product that is laid on top. As such, inter-pre-preg-product covalent bonds and/or a continuous LCT matrix extending throughout the composite product may be formed. Accordingly, a preferred embodiment of the present invention is a composite product that is based on plurality of pre-preg products that are at least partially covalently bound.

A further advantage of the use of the present pre-preg product may be that it may be processed like a thermoplastic before the LCT is set. In a robotic lay-up of LCT pre-preg tape, a high-temperature crosslinking heating element may be incorporated into the robotic system to cure the LCT in a continuous manner immediately following the lay-up placement.

A further advantage of the use of the present pre-preg product may be that an out-of-autoclave procedure may be applied. Thus no high pressures or temperatures that are commonly used with autoclave procedures may be required. This greatly facilitates the production processes of the composite materials resulting in improved productivity levels due to lower development costs, the ability to produce a large scale volumes without the need of (many and/or large) expensive autoclave systems, lower energy consumption, etcetera.

The LCT matrix is stable at high temperatures such that the composite product may be considered to be a high performance composite product. Preferably, the LCT matrix is stable at temperatures of up to 300° C., more preferably up to about 400° C. The high performance characteristics of the composite product are inter alia the result of the alignment of the director n of the LCT precursor with the nearest reinforcement fiber (vide supra). Without wishing to be bound by theory, it is believed that also after curing the LCT precursor to form the LCT matrix, the director n of the polymerized LCT precursors are oriented in substantially the same direction as the longitudinal axis of their nearest reinforcement fiber. As such, a favorable match in CTE of the matrix and the reinforcement fibers is obtained.

The composite product may be used for a variety of articles. Typical articles are structural components in general, such as fuselage of an aircraft, wings, fuel tanks, ailerons, flaps, flaperons, rudder, elevators, turbine engine blades, bypass ducts and other engine components, structural parts for windmills (support structure, blades), body parts, wheels and under the hood high temperature applications for automotive, sports goods (hockeysticks, bike frames, helmets . . . ), oil and gas components (composite piping, tanks, support structures), marine applications (composite ship hull, masts) and the like.

A further aspect of the present invention is thus an article comprising the composite product in accordance with the present invention.

For the purpose of clarity and a concise description features are described herein as part of the same or separate embodiments, however, it will be appreciated that the scope of the invention may include embodiments having combinations of all or some of the features described.

The invention can be illustrated with the following examples.

EXAMPLE 1

A pre-preg was prepared by drawing a roving of T600 carbon fibers through a die containing molten LCT precursor (resin:fiber ratio 3:7).

Figure 3:
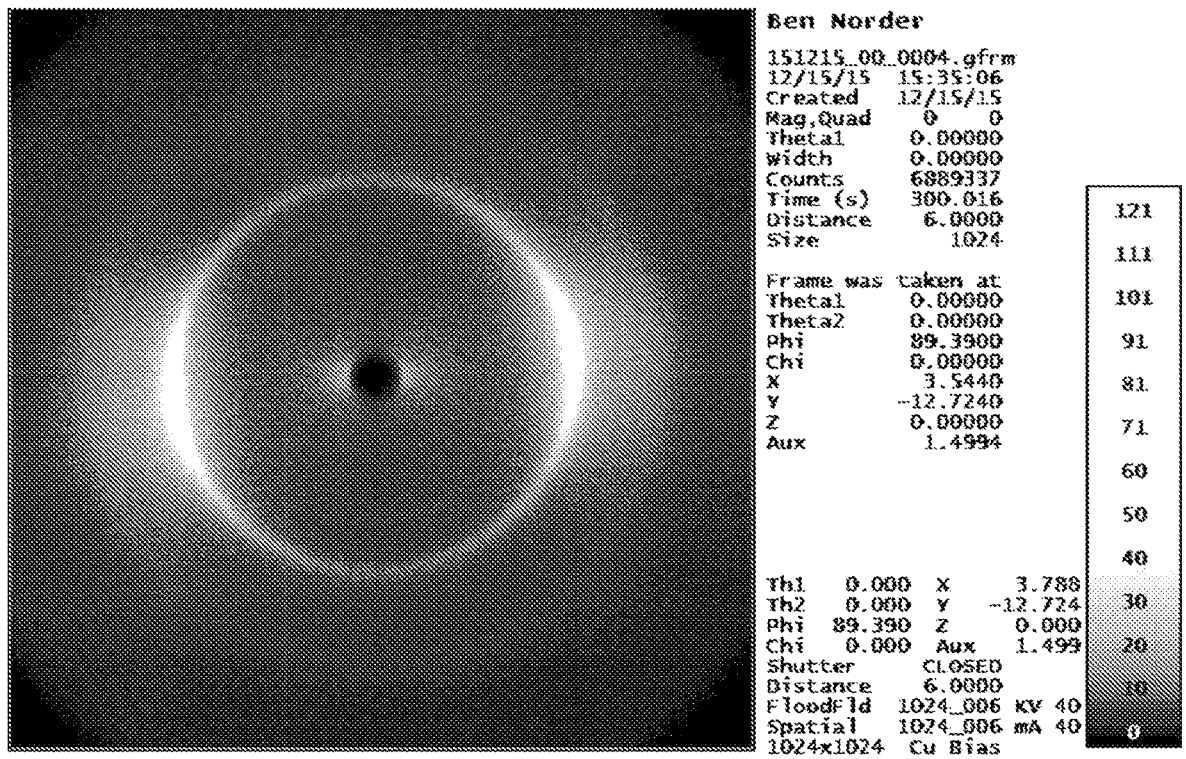

An X-ray diffraction pattern was recorded and is shown in FIG. 3, wherein the fiber axis is vertically oriented. The X-ray diffraction pattern shows that the LCT precursor is highly aligned parallel to the fiber direction.

Figure 4:
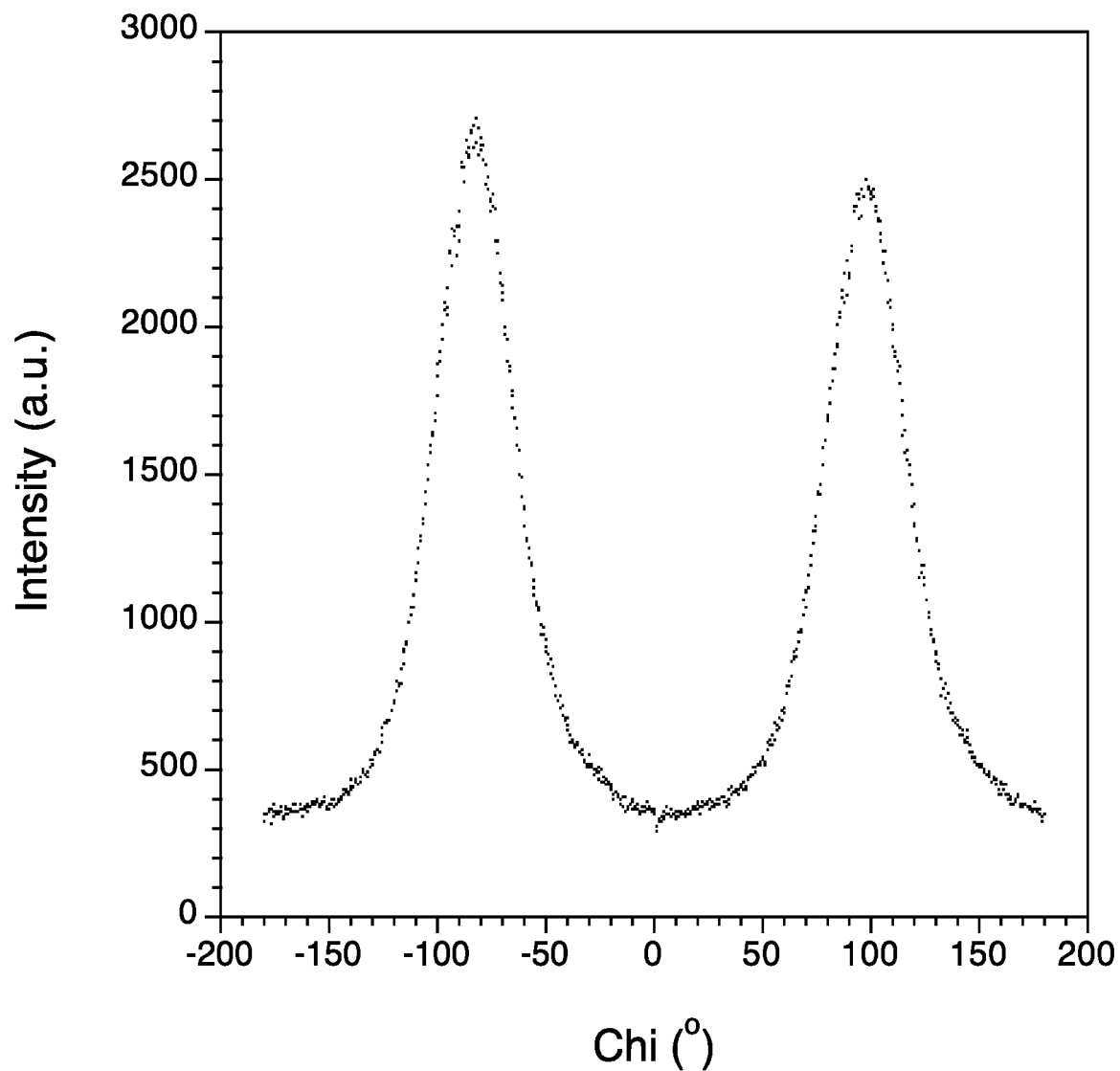

The intensity distribution indicates long-range orientation order of the LCT within the carbon fiber bundle. The intensity versus azimuthal angle ("chi") plot of the X-ray diffraction pattern (FIG. 4) enables one to determine the orientational order parameter, $<P_2>$, where $<P_2>$ is the average value of the second Legendre polynomial defining the orientation of the LCT molecular axes relative to the fiber direction. In this particular example, $<P_2>=0.79$.

The invention claimed is:

1. Pre-preg product suitable for forming a composite, comprising reinforcement fibers and a liquid crystal thermoset (LCT) precursor that is a reactive precursor capable of forming an LCT upon reaction and has a director n that is substantially oriented along the longitudinal axis of the nearest reinforcement fiber, wherein said pre-preg product is obtainable by a pultrusion process wherein an arrangement of the reinforcement fibers is moved through the melt comprising the liquid crystal thermoset (LCT) precursor.

2. Pre-preg product according to claim 1, wherein the LCT precursors have an orientational order parameter $<P_2>$ of between 0.1 and 1.

3. Pre-preg product according to claim 1, wherein the reinforcement fibers are selected from the group consisting of carbon fibers, fiber glass, aramid fibers, ceramic fibers, polybenzimidazole (PBI) fibers, polybenzoxazole (PBO) fibers, carbon nanotube fibers and combinations thereof.

4. Pre-preg product according to claim 1, wherein the liquid crystal thermoset (LCT) precursor is a liquid crystal thermoset (LCT) oligomer, optionally comprising a liquid crystal backbone selected from the group consisting of an ester, an ester-imide and an ester-amide, wherein at least 95 mol % of the monomers present in the backbone of the oligomer are aromatic.

5. Pre-preg product according to claim 4, wherein the LCT oligomer has a backbone having at least one structural repeat unit selected from the group consisting of

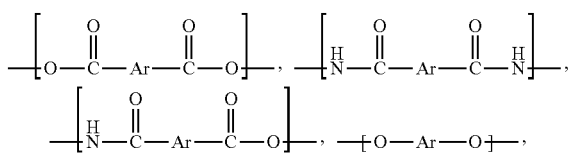

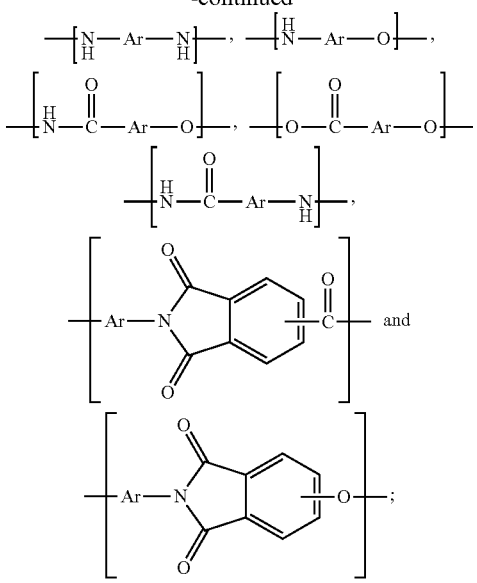

wherein Ar is an aromatic group.

6. Pre-preg product according to claim 4, wherein the LCT oligomer has a number average molecular weight ($M_n$) of 1,000-13,000.

7. Pre-preg product according to claim 4, wherein the LCT oligomer has a phenylacetylene, phenylmaleimide, or nadimide end-cap.

8. Pre-preg product according to claim 4, wherein the LCT oligomer has a self-reactive end-group selected from the group consisting of

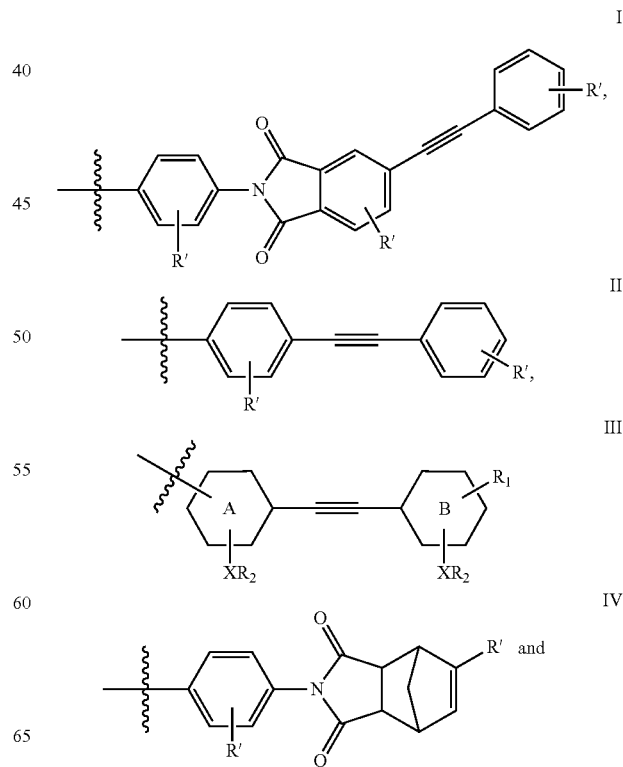

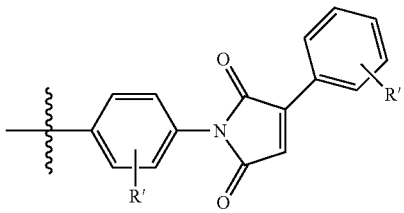

wherein R' is independently one or more hydrogen, alkyl groups containing six or less carbon atoms, aryl groups containing six or less carbon atoms, aryl groups containing less than ten carbon atoms, lower alkoxy groups containing six or less carbons, lower aryloxy groups containing ten or less carbon atoms, fluorine, chlorine, bromine or iodine, and; wherein rings A and B are independently a 6-membered aryl or heteroaryl, optionally fused to an aryl or heteroaryl; X is independently O, C(O), OC(O), C(O)O, S, $NR_1$, $C(O)NR_1$ or $NR_1C(O)$; $R_1$ is independently one or more alkynyl, alkyl, alkenyl, aryl, heteroaryl, cycloalkyl, heterocyclyl, halo, or haloalkyl and $R_2$ is independently hydrogen, hydroxyl, alkyl, aryl, heteroaryl, cycloalkyl, or heterocyclyl.

9. Method for preparation of the pre-preg product according to claim 1, comprising impregnating an arrangement of reinforcement fibers with the liquid crystal thermoset (LCT) precursor, wherein said impregnation comprises a pultrusion process wherein the arrangement of reinforcement fibers is moved through the melt comprising the liquid crystal thermoset (LCT) precursor to obtain an impregnated reinforcement fiber arrangement, and said method optionally further comprises moving the impregnated reinforcement fiber arrangement through a heated die to obtained a shaped impregnated fiber arrangement and subsequently cooling to obtain the pre-preg product.

10. Method according to claim 9, wherein the melt is at a temperature of between 200 and 400° C.

11. Pre-preg laminate product based on a plurality of stacked pre-preg products according to claim 1, wherein the longitudinal axis of the reinforcement fibers of a first pre-preg product that is stacked on a second prep-preg product are oriented in a different direction than the longitudinal axis of the reinforcement fibers of the second pre-preg product.

12. Composite product that is based on a plurality of pre-preg products according to claim 1, wherein at least part of the pre-preg products are covalently bound.

13. Method for the production of a composite product according to claim 12, further comprising laying and heat setting of the pre-preg products.

14. Method according to claim 10, wherein the melt is at a temperature of between 250 and 350° C.

* * * * *